United States Patent [19]

Gaiser

[11] Patent Number: 4,520,911
[45] Date of Patent: Jun. 4, 1985

[54] VEHICLE ATTITUDE RESPONSIVE BRAKE CONTROL DEVICE
[75] Inventor: Robert F. Gaiser, Stevensville, Mich.
[73] Assignee: Allied Corporation, Morristown, N.J.
[21] Appl. No.: 410,731
[22] Filed: Aug. 23, 1982
[51] Int. Cl.³ ............................................. B60K 41/24
[52] U.S. Cl. .................................. 192/13 A; 192/3 H; 192/4 A; 188/353
[58] Field of Search .................. 192/3 H, 13 A, 4 A; 188/353; 303/89

[56] References Cited
U.S. PATENT DOCUMENTS 2,030,288  2/1936  Freeman ............................... 192/13
2,136,410 11/1938  Boldt et al. ......................... 192/13 A
2,190,981  2/1940  Freeman ............................... 192/13 A
3,774,978 11/1973  Staunton et al. ....................... 303/89
4,247,154  1/1981  Shoji et al. ......................... 192/13 A Primary Examiner—George H. Krizmanich
Attorney, Agent, or Firm—Larry J. Palguta; Ken C. Decker

[57] ABSTRACT

A brake control device (16) includes a control member (70) cooperating with a housing (36) to partially define separate brake circuits. The control member is operable by an actuator (68) to close one way communication in the separate brake circuits via valves (86, 100) cooperating therewith.

17 Claims, 3 Drawing Figures

VEHICLE ATTITUDE RESPONSIVE BRAKE CONTROL DEVICE

This invention relates to a brake control device which is operable to maintain fluid pressure in a pair of brake circuits when a vehicle is facing upwardly and a clutch is disengaged.

A brake control device for a vehicle having a split system brake circuit communicating fluid pressure from a master cylinder to one set of brakes and communicating fluid pressure from the master cylinder to a second set of brakes independently of said one set, the control valve comprising a housing with a bore therethrough, a pair of valve members movably carried within the bore, a control member disposed within the bore and cooperating with the pair of valve members, and an actuator extending into the housing bore and engageable with the control member.

Brake control devices for vehicles with manual transmissions are commonly referred to as "Hill-Holders". They operate to relieve a vehicle operator of the precarious driving condition wherein the vehicle is situated on a hill facing upward. The vehicle operator must maintain one foot on the clutch and the other foot on the brake during a stop. When it is desired to drive up the hill, the operator must quickly accelerate with the other foot while engaging the clutch with the one foot before the vehicle starts to roll backward down the hill. This situation is avoided with conventional "Hill-Holders" as the brake fluid pressure is trapped in a brake circuit to a pair of wheels to prevent the vehicle from rolling backward.

The prior art is illustrated by U.S. Pat. No. 4,247,154, issued Jan. 27, 1981. The brake control valve therein is operable to control brake fluid pressure to a pair of brakes. The brake system includes a separate pair of brakes which are independent from the control valve so that only one pair of brakes are utilized for the brake control valve. Consequently, the prior art provides a brake control valve which is operable to hold a vehicle on a hill via only one pair of brakes when two pairs of brakes are provided on the vehicle. It is believed that a brake control device which is operable with both pairs of brakes would generate greater braking for a vehicle to prevent rolling of the vehicle while on a hill. At the same time, it is believed that separate brake control valves for each brake circuit would be redundant, thereby adding undesireable weight and cost to the vehicle.

In U.S. Pat. No. 2,136,410, issued Nov. 15, 1938, a pair of ball valves are included with a brake control device; however, each ball valve is operable separately to control fluid pressure to a brake circuit. This reference supports the prior art teaching in the above paragraph in that only one brake circuit is utilized at a time to hold a vehicle on a hill.

The present invention is characterized in that said control member sealingly engages the wall of said housing bore to substantially define a first fluid path communicating with said one set of brakes and a second fluid path separate from said first fluid path and communicating with said second set of brakes, and said control member being movable by said actuator from a rest position wherein said pair of valve members provides open communication between said master cylinder and said brake sets to an operable position wherein said pair of valve members close fluid communication in one direction from said brake sets to said master cylinder via said fluid paths.

It is an advantage of the present invention that both brake circuits are utilized for a "hill-holder" so that all the wheels of the vehicle are braked on a hill. Also a single housing incorporates the valve structure required for both brake circuits.

The invention will now be described with reference to the accompanying drawings in which.

Figure 1:
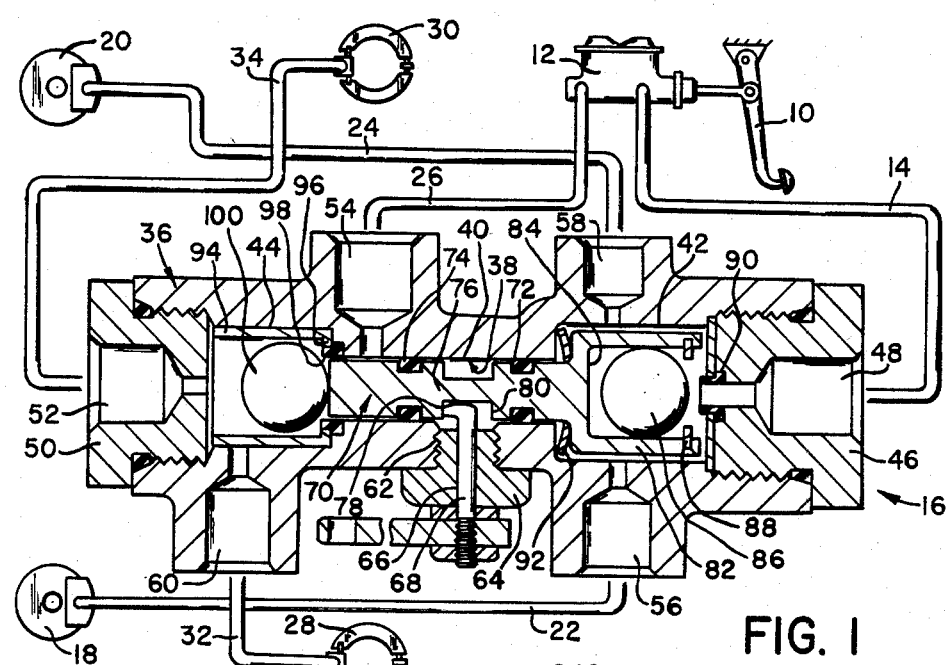
FIG. 1 is a schematic view of a vehicle brake system with a brake control device of the present invention shown in cross-section.

In FIG. 1 a brake pedal 10 is pivoted clockwise to control fluid pressurization of a master cylinder 12. A first brake circuit 14 communicates with a brake control device 16 to be described hereinafter, and with a pair of brakes 18 and 20 via conduits 22 and 24, respectively. A second brake circuit 26 communicates with the brake control device 16 and with a pair of brakes 28 and 30 via conduits 32 and 34, respectively. The brakes 18, 20, 28 and 30 can be arranged in a front to rear conventional split or a cross-split whichever is desired for the particular vehicle receiving the brake system.

The brake control device 16 includes a housing 36 with a stepped bore 38 therethrough. The stepped bore 38 defines a small intermediate diameter section 40, a first large diameter section 42 to the right of section 40 and a second large diameter section 44 to the left of section 40. A first closure plug 46 threadably engages the first section 42 and defines a first inlet 48 opening to the bore 38 and communicating with the first brake circuit 14. A second closure plug 50 threadably engages the second section 44 and defines an outlet 52 communicating the bore 38 with the conduit 34. A second inlet 54 intersects the section 40 to communicate the bore 38 with the second brake circuit 26. A pair of outlets 56 and 58 communicate the first section 42 with the conduits 22 and 24, respectively, while another outlet 60 communicates the second section 44 with the conduit 32. Finally, a housing opening 62 receives a plug 64 which, in turn, is apertured at 66 so that an actuator 68 extends into the bore 38 at the intermediate diameter section 40.

A control member 70 is movably disposed within the bore 38. The control member carries a pair of sealing rings 72 and 74 sealingly engaging the bore section 40 and defining a middle portion 76 sealingly isolated from the sections 42 and 44. The middle portion 76 is recessed to define oppositely facing shoulders 78 and 80, one of which is engageable with the actuator 68. The control member 70 defines an enlarged portion 82 within the first diameter section 42 and the enlarged portion 82 forms a cavity 84 receiving a first ball valve 86. A snap ring 88 retains the first ball valve 86 within the cavity 84. The closure plug 46 carries a valve seat 90 facing the first ball valve 86 such that when a spring 92 biases the control member 70 into abutment with the closure plug 46, the first ball valve is free to engage the valve seat 90 to close the first inlet 48 from the outlets 56 and 58. The diameter section 44 receives a cylindrical sleeve 94 with a radially internal flange 96 forming a valve seat 98. A second ball valve 100 is disposed in the diameter section 44 within the sleeve 94 and is free to engage the valve seat 98 provided the control member 70 is biased into engagement with the closure plug 46 whereby the second inlet 54 is closed from the outlets 52 and 60.

The actuator 68 and the control member 70 are shown in the rest position when a clutch assembly (not shown) coupled to the actuator 68 is engaged. In this position the actuator 68 maintains the control member leftwardly of the closure plug 46 against the force of spring 92 so that inlet 48 is open to outlets 56 and 58, and inlet 54 is open to outlets 52 and 60. When the clutch assembly is disengaged, the actuator 68 releases the control member from its rest position so that the spring 92 moves the control member into engagement with the closure plug 46. Consequently, the ball valves 86 and 100 will be free to engage the valve seats 90 and 98, respectively. If the vehicle is sitting on level ground, the ball valves will remain in their rest position spaced from the valve seats to permit fluid flow from the outlets to their associated inlets. However, if the vehicle is facing upward such as when driving up a hill, the ball valves will roll downwardly into engagement with the valve seats. In this engaged position a brake application will provide fluid communication from the inlets to the outlets to actuate the brakes 18, 20 and 28, 30; however, the ball valves act like check valves to prohibit fluid flow from the outlets to the inlets. Therefore, the brakes remain actuated when the clutch is disengaged on a hill upon termination of braking so that the vehicle remains stopped on the hill while the operator positions his feet on the clutch and accelerator. To start driving up the hill, the operator engages the clutch and accelerates simultaneously. By engaging the clutch, the operator actuates the actuator 68 to move the control member 70 leftwardly, thereby separating the ball valves from their valve seats and relieving the fluid pressure trapped in the brakes so that the vehicle is free to start up the hill.

In FIG. 1 it is seen that the control member 70 extends from the second diameter section 44 through the middle diameter section 40 and into the first diameter section 42. With the actuator 68 cooperating with the middle portion 76 of the control member 70, the control member forms a sealing engagement with only section 40 on opposite sides of the actuator 68.

Figure 2:
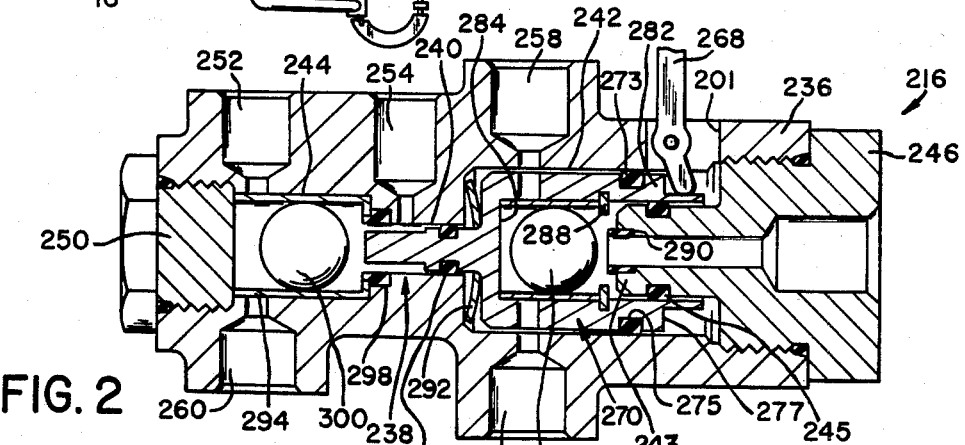
FIG. 2 is a view similar to FIG. 1 showing a first alternative embodiment for only the brake control device.
Figure 3:
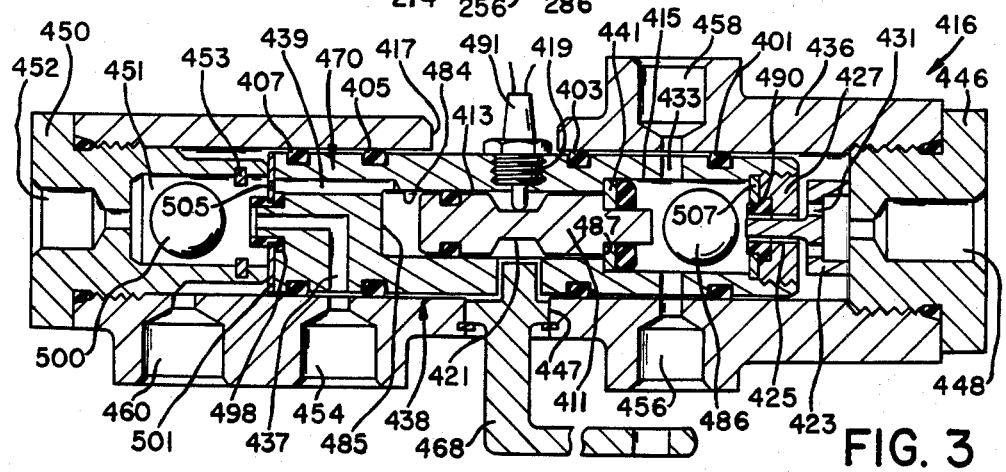
FIG. 3 is a view similar to FIG. 2 showing a second alternative embodiment.

Turning to the first alternative embodiment of FIG. 2, the control device 216 includes a housing 236 with a stepped bore 238 forming a first diameter section 242, a middle diameter section 240 and a second diameter section 244. In contrast to FIG. 1, the control device 216 provides a housing opening 201 at the first diameter section to receive an actuator 268 which is engageable with the end of control member 270 to move the latter within the stepped bore 238. The second diameter section 244 communicates with a pair of brakes (not shown) via a pair of radially extending outlets 252 and 260 rather than via the plug 250 as shown by FIG. 1. A pair of outlets 256 and 258 extend from the first diameter section 242 to another pair of brakes (not shown). The control member 270 sealingly engages the middle diameter section 240 and the first diameter section 242. In order to pressure balance the control member 270, the closure plug 246 includes an extension 243 carrying a sealing ring 245 which is engageable with the wall of cavity 284. The area of the control member across sealing ring 274 exposed to the fluid pressure from the inlet 254 is equal to the area of the control member across sealing ring 273 less the area across sealing ring 245. The extension also carries a valve seat 290 opposing the ball valve 286 while a cylindrical sleeve 294 carries a valve seat 298 opposing the ball valve 300. The cylindrical sleeve 294 guides the movement of the ball valve 300 within the second diameter section 244 while the wall of the cavity 284 in the control member 270 receives a sleeve to guide the movement of the ball valve in the first diameter section 242. A snap ring 288 causes the ball valve 286 to move with the control member 270 away from the valve seat 290 when the control member is moved to the left by the actuator 268 against the force of spring 292.

The control member 270 includes a recess 275 at the enlarged diameter portion 282 for carrying the sealing ring 273. The enlarged diameter portion 282 also defines a step at the right end with a shoulder 277 forming an abutment engageable with the actuator 268. The shoulder 277 is defined to the right of the sealing ring 273 so that the actuator 268 is not subjected to fluid pressure communicated through the housing 236.

The control device 216 operates in the same manner as the control device 16 so that when the vehicle associated therewith is facing upwardly, it is possible to stop the vehicle on the hill by depressing the brake pedal and disengaging the clutch. Thereafter, the foot operating the brake pedal can be repositioned on the accelerator and the vehicle will remain stopped on the hill until the clutch is reengaged.

In the second alternative embodiment the control device 416 includes a housing 436 with a uniform diameter bore 438 extending therethrough. The closure plug 446 defines a first inlet 448 and the housing 436 forms a first pair of outlets 456 and 458 on the right side of the housing 436. The left side of the housing 436 forms a second inlet 454 and a second outlet 460. The closure plug 450 defines another outlet 452.

The control member 470 carries a first pair of sealing rings 401 and 403 on opposite sides of the outlets 456 and 458 and a second pair of sealing rings 405 and 407 on opposite sides of the second inlet 454. The control member 270 further defines a cavity 484 extending from the right end to a bottom wall 485. The wall of the cavity is stepped with a shoulder 487 and a differential piston 411 is carried in the cavity in sealing engagement with a small bore section 413 of cavity 484 and a large bore section 415 of cavity 484. A switch assembly 491 extends through a housing opening 417 and a control member opening 419 to register with a recess 421 on the differential piston 411. The large bore section 415 also receives a first ball valve 486 and the closure plug 450 is extended to form a chamber 451 for carrying a second ball valve 500. A snap ring 453 on the closure plug 450 limits the movement of the ball valve 500 to the right. A plunger 423 opposes the closure plug 446 and extends through an opening 425 on a plug 427 closing the end of cavity 484. The plunger is engageable with the ball valve 486 when the clutch is engaged to separate the ball valve 486 from a valve seat 490. Similarly, the snap ring 453 is engageable with the ball valve 500 when the clutch is engaged to separate the ball valve 500 from a valve seat 498. The valve seat 498 is carried by a washer 501 with an opening 505 communicating the chamber 451 with an auxiliary passage 439. The valve seat 490 is carried by a washer 507 adjacent an opening 425.

In order to communicate fluid pressure from the inlet 448 to the outlets 456 and 458, the plunger 423 is apertured at 431 and defines a clearance with opening 425. The control member 470 includes at least two openings 433 between the sealing rings 401 and 403 so that fluid pressure within the cavity large bore section 415 will communicate through the openings 433 to the outlets 456 and 458. Viewing the left end of the control member 470, a passage 437 extends radially between the pair of sealing rings 405 and 407 and axially into the chamber 451 so that fluid pressure from the inlet 454 will communicate with the chamber 451 and to the outlets 452 and 460. An auxiliary passage 439 extends from the left end of the control member to the cavity 484. Consequently, fluid pressure communicated to the outlets 452 and 460 will be communicated to the left end of the differential piston 411 and fluid pressure communicated to the outlets 456 and 458 will be communicated to the right end of the differential pistons 411. The differential piston remains in its neutral position in view of the equal fluid pressures at both ends and the large diameter portion creating a larger force biasing the differential piston 411 to the left so that a washer 441 will abut a shoulder 443 between the bore sections 413 and 415.

In the second alternative embodiment, the control member 470 carries both valve seats 498 and 490 and an opening 445 opposite the opening 419 receives an actuator 468. The actuator 468 cooperates with a housing opening 447 to alter the position of the control member 470 within the bore 438 in response to the operation of a clutch assembly (not shown).

The brake control device 416 operates in the same manner as the previously described devices to hold a vehicle on a hill while the operator utilizes his feet to actuate a clutch pedal and an accelerator subsequent to a brake application on the hill. In addition, the brake control device 416 includes the switch assembly 491 which operates in a conventional manner to indicate when a pressure differential exists between the different brake circuits in common with the separate inlets 448 and 454. Also, because the switch assembly is carried by the control member 470, movement of the latter in response to actuation of the actuator 468 will not actuate the switch assembly 491. However, the dimension for the recess 421 and the dimension of travel for the control member are such that the switch assembly will be actuated even if the control member moves to the left and the right side brake circuit fails to permit movement of the piston 411 to the right. That is, the control member moves through a smaller travel than the piston 411 moves when the clutch is actuated and a brake pressure loss occurs in a brake circuit.

In conclusion, it is believed that a simple brake control device is provided which permits a "Hill-Holder" feature for a pair of separate brake circuits. With a conventional four wheel vehicle the present invention provides for a four wheel brake "Hill-Holder". There are many modifications feasible by one skilled in the art, and, as such, these modifications are intended to be covered by the appended claims.

I claim:

1. A brake control device for maintaining selectively and automatically an application of vehicle brakes when the vehicle is on an incline, in a vehicle having a split system brake circuit communicating fluid pressure from a master cylinder to one set of brakes and communicating fluid pressure from the master cylinder to a second set of brakes independent of said one set, the control device comprising a housing with a bore therethrough, a pair of attitude responsive valve members movably carried within the bore, a control member disposed within the bore and cooperating with the pair of valve members, said control member sealingly engaging said bore to substantially define a first fluid path communicating with said one set of brakes and a second fluid path separate from said first fluid path and communicating with said second set of brakes, and an actuator extending into the bore of the housing and engageable with the control member, the control member being movable by said actuator from a rest position wherein said pair of valve members provides open communication between said master cylinder and said brake sets to an operable position wherein said pair of attitude responsive valve members may be displaced responsively to vehicle attitude to close fluid communication in one direction from said brake sets to said master cylinder via said fluid paths in order to maintain said application of the vehicle brakes.

2. The brake control device of claim 1, in which said actuator is engageable with said control member at a portion thereof which is fluidly remote from said fluid paths.

3. The brake control device of claim 1, in which said bore is stepped to define at least a large diameter section and a small diameter section and a closure member is received at one end of said bore, said master cylinder communicating with said first fluid path via said closure member and with said second fluid path via said small diameter section.

4. The brake control device of claim 3, in which said closure member carries a sealing member engageable with one of said valve members.

5. The brake control device of claim 1, in which said control member defines a cavity at one end to receive one of said valve members and also defines a plunger at an opposite end.

6. The brake control device of claim 1, in which said bore is stepped to define a small diameter section and a large diameter section with a shoulder therebetween, and a resilient member extends from said shoulder to said control member to bias the control member to the rest position.

7. The brake control device of claim 1, in which said bore is stepped to define an intermediate small diameter section with a pair of large diameter sections at opposite ends thereof, said pair of valve members being disposed substantially within said pair of large diameter sections and said actuator extending into said small diameter section to engage said control member.

8. The brake control device of claim 7, in which said control member carries a pair of sealing members on opposite sides of said actuator to isolate said actuator from fluid pressure.

9. The brake control device of claim 7, in which said control member extends from one of said pair of large diameter sections to the other of said pair of large diameter sections, and said control member sealingly engages only said intermediate small diameter section.

10. The brake control device of claim 1, in which said control member sealingly engages said bore to define a portion of the control member isolated from the fluid paths through said housing, and said actuator is engageable with said portion.

11. The brake control device of claim 6, wherein said control member includes an enlarged diameter portion containing one of said valve members movably carried therein.

12. The brake control device of claim 11, wherein said enlarged diameter portion is disposed within said enlarged diameter section of the bore and the resilient member comprises a Belleville washer.

13. The brake control device of claim 1 in which said control member carries a pressure responsive piston which is exposed to the fluid pressure communicated to said fluid paths, said pressure responsive piston being movable relative to said control member in response to a pressure differential between said fluid paths to actuate means for signalling the pressure differential.

14. A brake control device for maintaining selectively and automatically an application of vehicle brakes when the vehicle is on an incline, comprising a housing with a bore therethrough, a pair of attitude responsive valve members within said bore, a control member disposed within said bore and extending between said pair of attitude responsive valve members, the control member sealingly cooperating with the housing to partially define a pair of separate fluid paths extending through the housing and permitting a master cylinder to communicate with separate brake circuits, respectively, and an actuator extending into the housing and cooperating with the control member to move the latter from a first rest position to an actuated position, the control member in the rest position maintaining the pair of attitude responsive valve members open to permit fluid communication between the master cylinder and the pair of separate brake circuits, and the control member in the actuated position permitting the pair of attitude responsive valve members to be displaced responsively to vehicle attitude to substantially prevent fluid communication in one direction from the pair of separate brake circuits to the master cylinder in order to maintain said application of the vehicle brakes.

15. The brake control device of claim 14, in which said actuator is operatively coupled to a clutch and said control member simultaneously permits said pair of attitude responsive valve members to be displaced and substantially prevent fluid communication in said one direction from the pair of separate brake circuits to the master cylinder when the clutch is disengaged and the actuator operated.

16. The brake control device of claim 14, wherein said control member includes an enlarged diameter portion containing one of said valve members movably carried therein.

17. The brake control device of claim 16, in which said bore is stepped to define a small diameter section and a large diameter section with a shoulder therebetween, the enlarged diameter portion of the control member disposed within said large diameter section of the bore, and a resilient member extending from said shoulder to said control member to bias the control member to the rest position.

* * * * *